United States Patent
Wiser

Patent Number: 5,127,627
Date of Patent: Jul. 7, 1992

[54] VALVE FOR AN INFLATABLE ARTICLE

[75] Inventor: David B. Wiser, Ventura, Calif.

[73] Assignee: CUI, Inc., Carpinteria, Calif.

[21] Appl. No.: 711,445

[22] Filed: Jun. 6, 1991

[51] Int. Cl.⁵ .............................. F16L 37/28
[52] U.S. Cl. .................................. 251/149.1
[58] Field of Search ................ 137/223; 251/149.1

[56] References Cited

U.S. PATENT DOCUMENTS

| | | | |
|---|---|---|---|
| 3,410,300 | 11/1968 | Mondaovo | 137/323 |
| 4,662,883 | 5/1987 | Bell et al. | 137/323 |
| 4,930,535 | 6/1990 | Rinehold | 251/149.1 |

*Primary Examiner*—A. Michael Chambers
*Attorney, Agent, or Firm*—Michael G. Petit

[57] ABSTRACT

An improved self-sealing valve for use in a fluid fillable article includes a main body portion and a channel portion for receiving a fill tube. The channel portion within the main body portion is a substantially flat, elongated conduit having a pair of opposing sealed edges and, between said edges, a pair of flat flexible wall members facing each other to form a fluid seal when they bear against one another. The conduit is open at both ends. The channel passing through the valve has constrictions along its wall which change the contour of the channel so that a fill tube passed through the channel does not dislodge a sealing gel from within the channel. When fully inserted, a fill tube seats firmly against the constrictions and prevents back leakage during the filling process. Upon removal of the fill tube, the constrictions wipe the sealing gel from the fill tube shaft and retains it within the valve channel. By retaining the sealing gel, the sealing capability is improved during multiple fill tube insertions. The end of the valve channel includes a tapered width which further reduces the chance of back leakage during the fill process.

1 Claim, 2 Drawing Sheets

VALVE FOR AN INFLATABLE ARTICLE

BACKGROUND OF THE INVENTION

1. Field of the Invention

The present invention relates to self-sealing valves, and in particular, it relates to self-sealing valves for use with inflatable articles.

2. Description of the Prior Art

Valves affixed to the surface of inflatable articles are well known in the art. Such valves are designed to accommodate the passage therethrough of a fill tube which fill tube conducts a filling medium into the inflatable article. Such valves are described in, for example, U.S. Pat. Nos. 1,702,974; 2,700,980; 4,662,883; 3,410,300; and 4,930,535. A fill tube is typically inserted into the inflation chamber of an article through such a valve. The valve is typically made of two sheets of silicone rubber bonded together along their edges with a channel therebetween.

Silicone gel is frequently used to either fill or partially fill the channel for two reasons. First, it is an excellent lubricant and facilitates the entry and passage of a fill tube through the channel. Second, if a fill tube is disposed within the valve for a long time, stresses in the silicone rubber forming the channel result in the valve not sealing adequately once the fill tube is removed. The channel becomes somewhat "set" in an open position and remains in the open position once the fill tube has been removed. To facilitate sealing of the valve channel once the fill tube is removed, a quantity of viscous gel is often disposed between the walls to partially fill the channel thereby to improve the sealing properties of the channel.

The valves of the type we are talking about here are the only entrance or exit of fluid from the interior of the article. It is also assumed that the article must be frequently inflated or deflated or the fill tube must be frequently reinserted and removed from the valve. Under such conditions, the sealing gel housed within the prior art valves is dislodged from the channel and either pushed into the article during insertion of the fill tube or pulled out of the valve during removal of the fill tube. To overcome these problems and provide a valve having the ability to retain a gel placed in the channel thereof even after multiple insertion of a fill tube, the present improved valve has been invented.

SUMMARY OF THE INVENTION

An object of the improved valve of the present invention is to provide a fill valve for use with an inflatable article which valve retains a sealing gel placed in the channel thereof even after repeated insertions and withdrawals of a fill tube.

It is another object of the invention to provide an improved valve which provides a tight seal against the wall of a fill tube passed therethrough to prevent back-leakage.

It is yet another object of this invention to provide an improved fill valve for use with an inflatable article which fill valve has constrictions in the channel wall thereof which constrictions prevent the over-insertion of a fill tube into said article.

These and other objects of the invention will be apparent by turning now to the drawings.

DESCRIPTION OF THE PREFERRED EMBODIMENT

Figure 1:
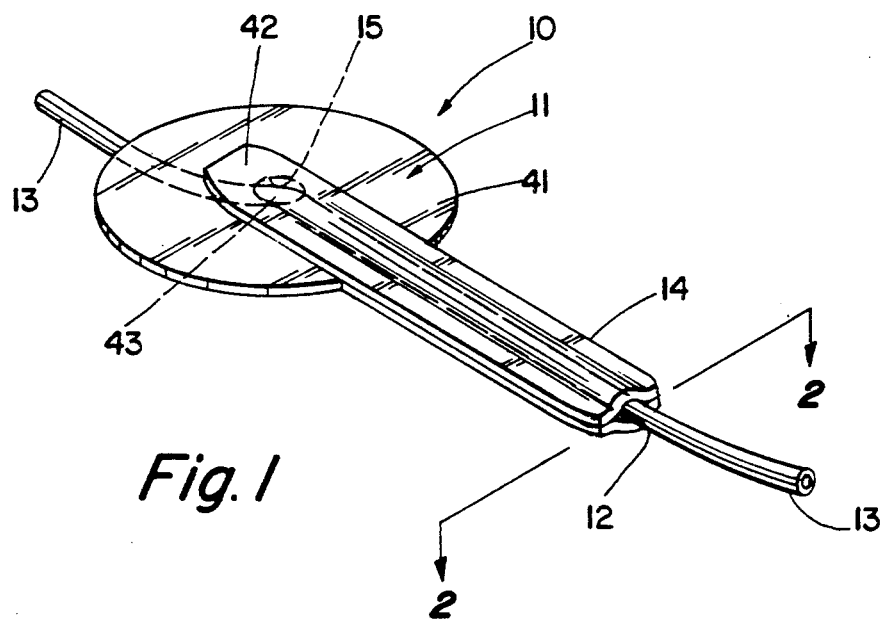
FIG. 1 is a perspective view of the improved fill valve with the valve containing a fill tube.

FIG. 1 illustrates the valve of the present invention with a fill tube in place. The valve is used to provide a fill tube with access to the interior of a fluid-filled device. The valve is self-sealing to the track of a fill tube inserted therein and removed therefrom. The valve, generally indicated at 10, includes a main body portion 11 having a channel 12 passing therethrough. A fill tube 13 is shown inserted to pass through the valve. The valve 10 has an interior end 14 which, in operation, extends into the inner chamber of the fluid-fillable device and serves as a seal when the fill tube 13 is removed from the device.

Figure 2:
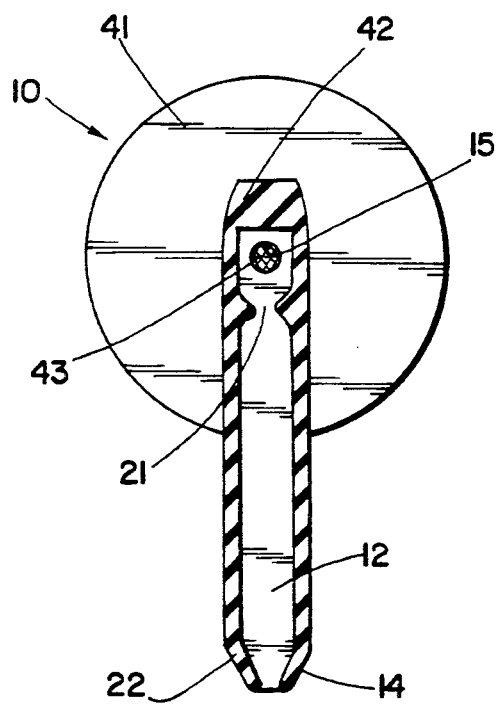
FIG. 2 is a horizontal sectional view taken on line 2—2 of FIG. 1 without the fill tube.

FIG. 2 shows a cutaway view of the valve of FIG. 1 along line 2—2.

The channel 12 has a constricted portion 2) which provides a means for retaining sealing gel (not shown) within the channel when the fill tube (not shown in FIG. 2) is withdrawn. The constriction 21 also provides a shoulder or stop for a fill tube wherein a portion of the length of the fill tube has an outer diameter greater than the diameter of the constricted portion (21) of the channel (12).

Figure 3:
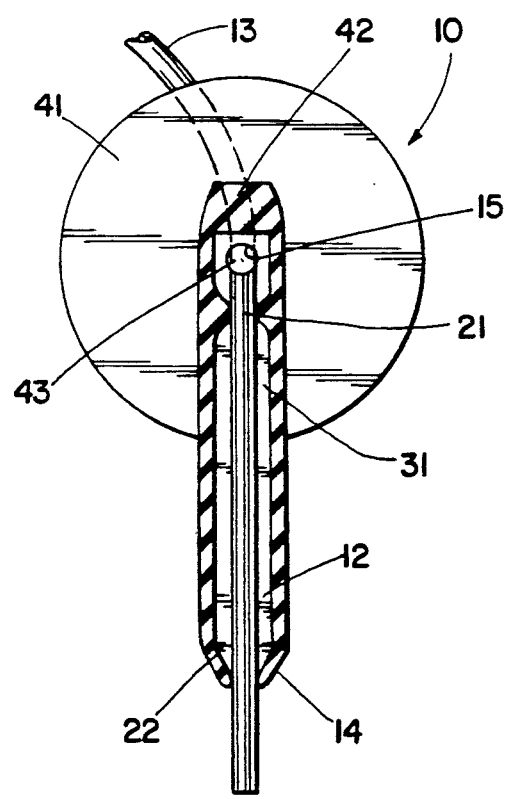
FIG. 3 is as in FIG. 2 with the valve containing a fill tube.

It is further shown that the channel through the interior end 14 of the valve may be lengthened and have an inwardly tapered portion 22 which portion fits snugly against the walls of a fill tube passed therethrough in the manner of FIG. 3. In FIG. 3, a sealing gel would normally be housed within the channel in the region 31 between the constriction 21 and the tapered portion 22. As the fill tube 13 is inserted through an opening 15 in the valve body 11 it encounters an impermeable backing 43 (FIG. 4) and can only progress into the channel in the direction of the interior end 14. As the tube passes the constriction 21 and enters the gel retaining portion of the channel 31, the fill tube tends to push the gel before it. For this reason, most fill tubes have a tapered end to immunize abrupt displacement of sealing gel from the channel and facilitate entry of the fill tube into the channel. When the tip of the fill tube reaches the interior end 14 of the valve, the tapered portion 22 of the channel wipes away any gel adhering to the outer walls of the fill tube thereby preventing injection of the gel into the interior of the fillable device (not shown) to which the valve would normally be affixed. Upon withdrawal of the fill tube, the gel adhering to the walls is wiped off by the shoulders bordering the constricted portion 21 of the channel thereby retaining the gel within the channel.

Figure 4:
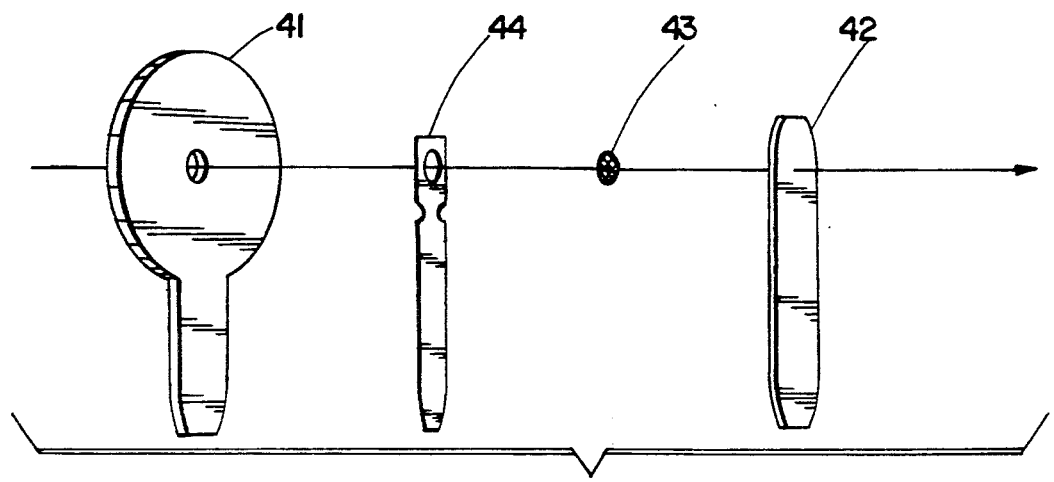
FIG. 4 is an organizational scheme of valve elements prior to forming and vulcanization.
Figure 5:
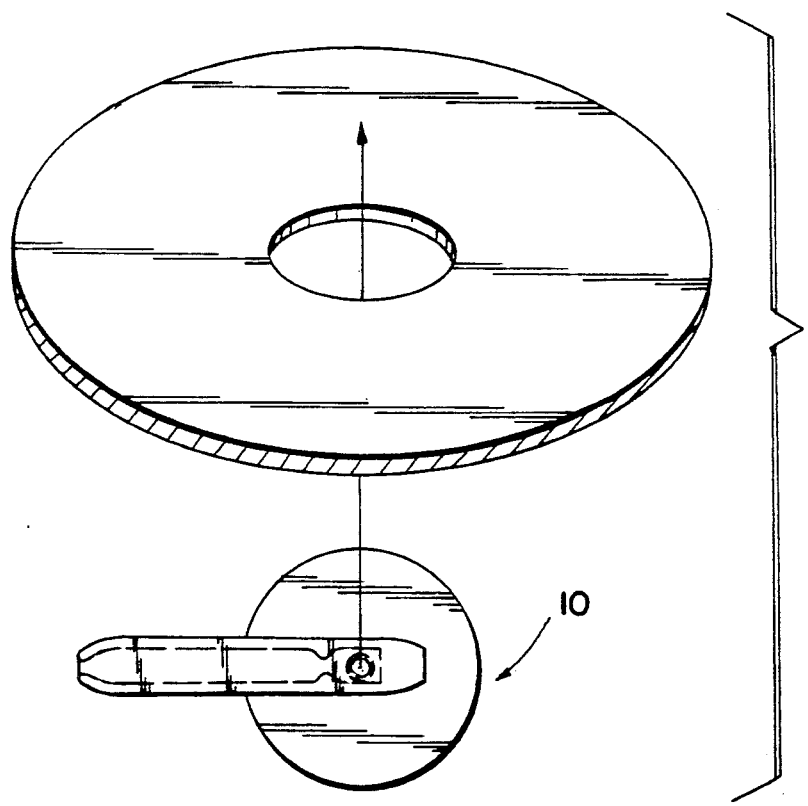
FIG. 5 is a perspective view of attachment of improved valve to the inner surface of a fluid-fillable chamber.

Turning now to FIG. 4, the valve is constructed by vulcanizing two sheets of pre-cut silicone rubber 41 and 42, one of which (42) is uncured, together in the manner shown. A third sheet of cured silicone 44, cut to the desired shape of the channel and an uncured dacron-reinforced silicone disc 43 are interposed therebetween prior to vulcanization. Since sheet 44 is pre-cured, it does not bond to sheet 41 thus forming a channel therebetween. The valve body 11 may be vulcanized to a receiving opening in a fluid-fillable device as shown in FIG. 5.

What I claim is:

1. In a gel-sealed valve for filling and sealing a fluid-fillable article, the valve including a main body portion comprising an exterior valve opening and an interior valve opening and a longitudinal channel portion forming a lumen therebetween, said channel portion having a longitudinal axis and being dimensioned to receive a fill-tube, said channel portion containing a sealing gel and being substantially uniform in cross-section along the length of its longitudinal axis, the improvement comprising a first elastic constriction in the lumen of the channel portion substantially adjacent to the exterior valve opening and a second elastic constriction in the lumen of the channel portion substantially adjacent to the interior valve opening, said first and second constrictions substantially confining said sealing gel to the channel portion of the valve thereby preventing the loss of sealing gel from the channel portion during fill tube insertion and removal.

* * * * *